United States Patent [19]

Evans et al.

[11] Patent Number: 5,672,574

[45] Date of Patent: Sep. 30, 1997

[54] STABILIZERS FOR ORGANIC MATERIALS

[75] Inventors: Samuel Evans, Marly; Stephan Allenbach, Düdingen, both of Switzerland

[73] Assignee: Ciba-Geigy Corporation, Tarrytown, N.Y.

[21] Appl. No.: 530,974

[22] Filed: Sep. 20, 1995

[30] Foreign Application Priority Data

Sep. 22, 1994 [CH] Switzerland ............... 2889/94-9

[51] Int. Cl.$^6$ ............... C10M 129/10; C10M 129/16
[52] U.S. Cl. ............... 508/584; 508/585; 252/73; 252/77; 252/78.1; 252/79; 72/42; 524/324; 524/334; 524/351
[58] Field of Search ............... 508/584, 585; 524/324, 334, 351

[56] References Cited

U.S. PATENT DOCUMENTS

| | | | |
|---|---|---|---|
| 3,093,587 | 6/1963 | Ecke et al. | 508/584 |
| 3,491,157 | 1/1970 | Dietzler et al. | 508/584 |
| 3,864,307 | 2/1975 | Nast et al. | 524/324 |
| 4,066,562 | 1/1978 | Wollensak et al. | 508/585 |
| 4,315,850 | 2/1982 | Kugele | 524/181 |
| 4,507,420 | 3/1985 | Rosenberger | 508/585 |
| 4,513,109 | 4/1985 | Rosenberger | 508/585 |
| 4,532,059 | 7/1985 | Rosenberger | 508/585 |
| 4,708,809 | 11/1987 | Davis | 508/584 |
| 5,153,291 | 10/1992 | Leitz et al. | 526/279 |
| 5,473,003 | 12/1995 | Pitteloud et al. | 524/334 |

FOREIGN PATENT DOCUMENTS

| | | |
|---|---|---|
| 0348744 | 1/1990 | European Pat. Off. |
| 1235894 | 3/1967 | Germany |

OTHER PUBLICATIONS

D. Lednicer et al., J. Med. Chem., vol. 9, pp. 172–176 (1966 Mar.).

D. Lednicer et al., Chem. & Ind., pp. 408–410, (Mar. (1963).

W.L. Bencze et al., J. Med. Chem., vol 8, pp. 213–214 (1965) (No Month).

A. Nishinage et al., J. Org. Chem., vol. 51, pp. 2257–2266 (1986) (Month N/A). Communications.

G. Casiraghi et al., Synthesis, pp. 122–124, (Feb. 1977).

Chem. Abstract 59280y of DE 1,235,894 vol. 68 p. 5721 (1968). Month N/A.

*Primary Examiner*—Ellen M. McAvoy
*Attorney, Agent, or Firm*—Michele Kovaleski; Luther A. R. Hall

[57] ABSTRACT

Compositions comprising compounds of formula

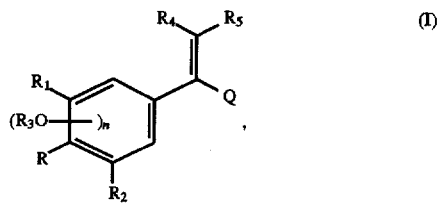

wherein the radicals R and $R_1$ to $R_5$ are as defined in claim 1, are described.

Some of those compounds are novel. They are suitable for the stabilization of organic materials.

17 Claims, No Drawings

STABILIZERS FOR ORGANIC MATERIALS

The present invention relates to compositions comprising an organic material liable to oxidative, thermal and/or actinic degradation and at least one compound of formula I described below. The invention relates also to the use of those compounds as additives for stabilising organic material and to novel compounds of formula I.

Structurally similar compounds have already been described in some cases as pharmaceutical agents [see, for example, D. Lednicer et al., J. Med. Chem. 9, 172 (1966), D. Lednicer et al., Chem. Ind. 1963, 408, and W. L. Bencze et al., J. Med. Chem. 8, 213, (1965)].

In U.S. Pat. No. 4,315,850, compounds having phenylalkenyl groups are mentioned as ABS heat stabilisers. An example is the compound of the formula

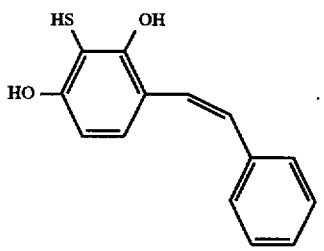

The compounds described therein always carry an SH group on the phenyl ring.

The present case now proposes compounds of formula I in compositions with organic materials for improving the stability and working properties of the latter. In addition, novel compounds of formula I have been found which are likewise excellently suitable for the protection of organic material against thermal, oxidative and/or actinic degradation.

The present invention relates accordingly to compositions comprising an organic material liable to thermal, oxidative and/or actinic degradation and at least one compound of formula (I)

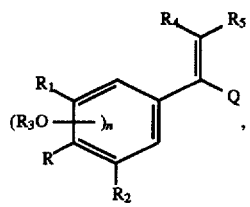 (I)

wherein

Q is a radical

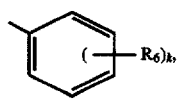

wherein n is 1 or 2 and k is 0, 1 or 2, or Q together with $R_5$ forms a group

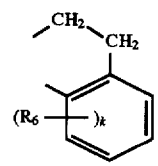

and n is 1,

R is hydrogen, has the same possible meanings as $R_3O$ or, when $R_3$ is hydrogen and n is 1, together with $R_1$ or with $R_2$ forms a group,

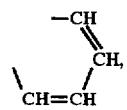

$R_1$ is hydrogen, $C_1$–$C_{18}$alkyl, $C_5$–$C_{12}$cycloalkyl, phenyl, benzyl, α-methylbenzyl, α,α-dimethylbenzyl or diphenylmethyl or is a radical of the formula

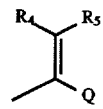

or a group of the formula

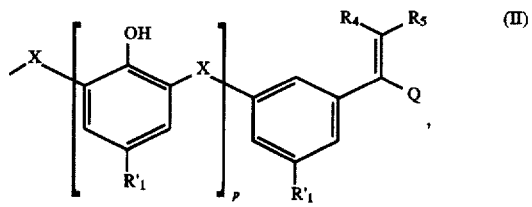 (II)

$R'_1$ is $C_1$–$C_{18}$alkyl, benzyl, α-methylbenzyl or α,α-dimethylbenzyl,

X is a direct bond or a group >$CR_{17}R_{18}$ or (—S—)$_m$, p is 0 to 8 and m is 1 to 3, $R_2$ is hydrogen, $C_1$–$C_{18}$alkyl, phenyl, $C_5$–$C_{12}$cycloalkyl, benzyl, α-methylbenzyl, α,α-dimethylbenzyl or diphenylmethyl or is a group of the formula

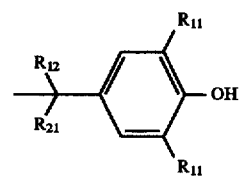

or of the formula

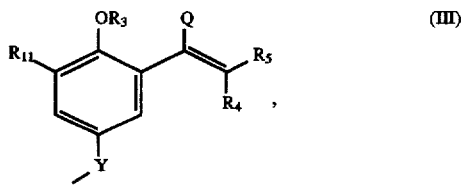 (III)

Y is >$CR_{19}R_{20}$, >S or >$C(CH_3)$—$(CH_2)_q$—E—$R_9$, q is 1 or 2 and

E is CO—O or O—CO, or $R_2$ is $C_bH_{2b}$—D—$R_{10}$ and b is 0 to 3,

D is CO—O, O—CO, NH—CO or CO—NH, or $R_2$ is a radical of the formula

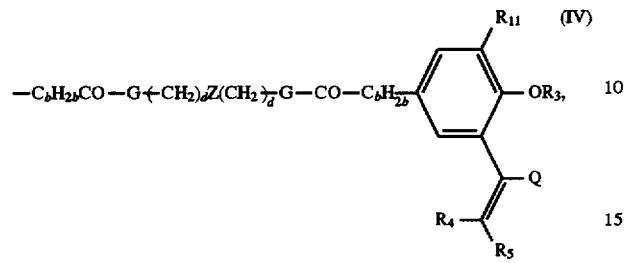

G is —O— or >NH, d is 2 or 3,

Z is a direct bond, —O—, >$NR_{22}$ or —S—, or $R_2$ is a group of formula IVa

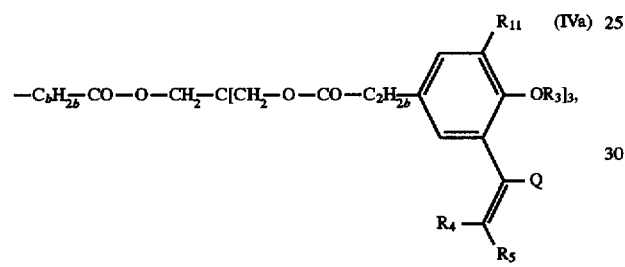

$R_3$ is hydrogen, $C_1$-$C_{18}$alkyl, $C_5$-$C_{12}$cycloalkyl, phenyl, benzyl, α-methylbenzyl, α,α-dimethylbenzyl, diphenylmethyl or —CO—$R_8$ or is a group of the formula (V),

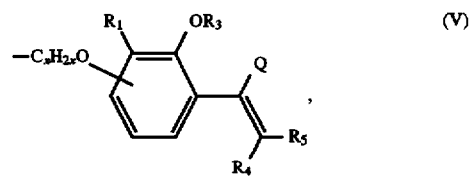

x is 2 to 10, $R_4$ and $R_5$ are each independently of the other hydrogen, $C_1$-$C_{12}$alkyl, $C_5$-$C_{12}$cycloalkyl, phenyl, benzyl, α-methylbenzyl or α,α-dimethylbenzyl, $R_6$ is —$NO_2$, —C≡N, —$COOR_{13}$, —S—$R_{14}$, —$SOR_{14}$, —$SO_2$—$R_{14}$, —$NR_7R_{7a}$, Cl, Br, F, —$OR_{15}$ or —$COR_{16}$, or two radicals $R_6$ together form a fused-on benzo ring, $R_7$ and $R_{7a}$ are each independently of the other hydrogen or $C_1$-$C_{12}$alkyl, $R_8$ is hydrogen, $C_1$-$C_{18}$alkyl, phenyl or $C_2$-$C_3$alkenyl, $R_9$ is hydrogen, $C_1$-$C_{18}$alkyl or a group of the formula

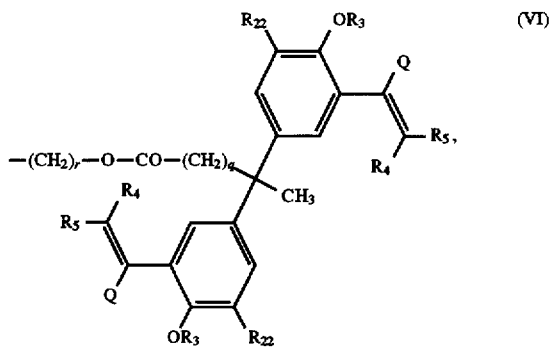

r is 2 to 6 and q is 1 or 2, $R_{10}$ is hydrogen or $C_1$-$C_{18}$alkyl, $R_{11}$ is $C_1$-$C_{12}$alkyl, phenyl, $C_5$-$C_{12}$cycloalkyl, benzyl, α-methylbenzyl or α,α-dimethylbenzyl, $R_{12}$ is hydrogen or methyl, $R_{13}$ is hydrogen or $C_1$-$C_{18}$alkyl, $R_{14}$ is $C_1$-$C_8$alkyl or phenyl, $R_{15}$ is hydrogen, $C_1$-$C_{18}$alkyl, phenyl, $C_5$-$C_{12}$cycloalkyl, benzyl, α-methylbenzyl or α,α-dimethylbenzyl, $R_{16}$ is $C_1$-$C_{18}$alkyl, phenyl, $C_5$-$C_6$cycloalkyl, acryloyl, methacryloyl, benzyl, α-methylbenzyl or α,α-dimethylbenzyl, $R_{17}$ and $R_{18}$ are each independently of the other hydrogen, $C_1$-$C_{18}$alkyl or phenyl, $R_{19}$ is hydrogen, $C_1$-$C_{18}$alkyl or phenyl, $R_{20}$ is hydrogen, $C_1$-$C_{18}$alkyl or phenyl, $R_{21}$ is hydrogen or methyl and $R_{22}$ is hydrogen, $C_1$-$C_{18}$alkyl, $C_5$-$C_{12}$cycloalkyl or phenyl.

Advantageous compositions comprise compounds of formula I as described above, but wherein $R_1$ is hydrogen, $C_1$-$C_{12}$alkyl, cyclohexyl, phenyl, benzyl, α-methylbenzyl, α,α-dimethylbenzyl or a group of formula II, X is a group >$CHR_{17}$ or —S—, p is 0 to 4, $R'_1$ is $C_1$-$C_{12}$alkyl, $R_2$ is hydrogen, $C_1$-$C_8$alkyl, cyclohexyl, benzyl, α-methylbenzyl, α,α-dimethylbenzyl or phenyl or is a radical of formula III, Y is —S—, >$CR_{19}R_{20}$ or >$C(CH_3)$—$CH_2$—CO—$R_9$, or $R_2$ is a radical of formula IV, Z=—O— or —S— and d=2, or $R_2$ is —($CH_2$)$_2$—CO—$OR_{10}$, $R_3$ is hydrogen, $C_1$-$C_8$alkyl, phenyl, —CO—$R_8$ or a radical of formula V wherein $R_1$ is hydrogen, x is 2 to 6, $R_4$ and $R_5$ are each independently of the other hydrogen, $C_1$-$C_8$alkyl, phenyl, benzyl, α-methylbenzyl or α,α-dimethylbenzyl, $R_6$ is —$NO_2$, —C≡N, —$COOR_{13}$, —CO—$R_{16}$, —SO—$R_{14}$, —$SO_2$—$R_{14}$ or fluorine, $R_8$ is $C_1$-$C_8$alkyl or phenyl, $R_9$ is $C_1$–$C_8$alkyl, $R_{10}$ is hydrogen or $C_1$–$C_{18}$alkyl, $R_{11}$ is $C_1$–$C_4$alkyl, $R_{13}$ is $C_1$–$C_{12}$alkyl, $R_{14}$ is $C_4$–$C_8$alkyl or phenyl, $R_{17}$ is hydrogen, $C_1$–$C_4$alkyl or phenyl, $R_{19}$ is hydrogen or $C_1$–$C_4$alkyl and $R_{20}$ is hydrogen or $C_1$–$C_4$alkyl.

Also to be regarded as advantageous are compositions wherein at least one of the groups $R_3O$ is hydroxy; and also compositions wherein one $R_3O$ radical is in the ortho-position to the alkenyl group; and especially compositions wherein n is 1 and $R_3O$ is OH and is in the ortho-position to the alkenyl group.

Preferred compositions comprise compounds of formula I wherein

R has the same possible meanings as $R_3O$ or is hydrogen, $R_1$ is hydrogen, $C_1$–$C_{12}$alkyl, benzyl or α-methylbenzyl or corresponds to a radical of the formula

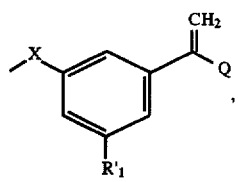

X is —$CH_2$— or —S—, $R'_1$ is $C_1$–$C_4$alkyl, $R_2$ is H, $C_1$–$C_8$alkyl, benzyl, α-methylbenzyl or a radical of the formula —$(CH_2)_2$—CO—$OR_{10}$, $R_{10}$ is $C_1$–$C_{18}$alkyl, $R_3$ is hydrogen, CO—$C_1$–$C_4$alkyl or $C_1$–$C_{18}$alkyl or corresponds to the formula

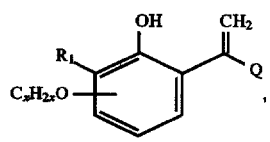

x is 2 to 6, $R_4$ is hydrogen, $R_5$ is hydrogen, ethyl, methyl or benzyl and $R_6$ is $NO_2$, S-phenyl or $SO_2$-phenyl.

Especially preferred compositions comprise compounds of formula I wherein

R is hydrogen, —O—$C_1$—$C_{12}$alkyl or a radical of the formula

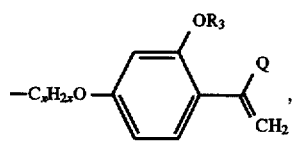

$R_1$ is hydrogen or $C_1$–$C_{12}$alkyl, $R_2$ is hydrogen or $C_1$–$C_8$alkyl, $R_4$ and $R_5$ are hydrogen, x is 2 to 6, n is 1 and $R_3$ is hydrogen or —CO—$C_1$–$C_{12}$alkyl.

In the compounds of formula I, preferably only one or two, especially only one, of the groups of formulae II, III, IV, IVa, V and VI is(are) present.

When radicals in the above formulae are $C_1$–$C_{18}$- or $C_1$–$C_{22}$-alkyl, those radicals are branched or unbranched radicals. Examples thereof are methyl, ethyl, propyl, isopropyl, n-butyl, isobutyl, tert-butyl, pentyl, isopentyl, hexyl, heptyl, 3-heptyl, octyl, 2-ethylhexyl, nonyl, decyl, undecyl, dodecyl, tridecyl, tetradecyl, pentadecyl, hexadecyl, heptadecyl, octadecyl, 2-ethylbutyl, 1-methylpentyl, 1,3-dimethylbutyl, 1,1,3,3-tetramethylbutyl, 1-methylhexyl, isoheptyl, 1-methylheptyl, 1,1,3-trimethylhexyl or 1-methylundecyl; the radicals have preferably 1–12, especially 1–8, carbon atoms. Further alkyl groups in the above formulae have the equivalent meanings given by way of example up to the appropriate number of carbon atoms.

When substituents in formula I are halogen, halogen is to be understood as being Cl, Br, F and I, especially F, Cl and Br, more especially F.

Radicals representing $C_5$–$C_{12}$cycloalkyl may be, for example, cyclopentyl, cyclohexyl, cycloheptyl, cyclooctyl or cyclododecyl. Cyclopentyl and cyclohexyl are preferred, especially cyclohexyl.

$C_2$–$C_3$alkenyl is, for example, vinyl or allyl.

A particular feature of organic materials, in contrast to inorganic materials which are generally stable up to high temperatures, is that they decompose relatively easily under the action of heat, light or radiation, mechanical stress (especially shearing forces) and chemical reagents (especially atmospheric oxygen).

Protection against such effects is provided by the compounds of formula I which, in the compositions according to the invention, should be present in the organic materials in an amount of advantageously from 0.01 to 10, for example from 0.05 to 5, preferably from 0.05 to 3, but especially from 0.1 to 2, % by weight. One or more of the compounds may be involved, and the percentages by weight relate to the total amount of those compounds. The basis for calculation is the total weight of the organic material without the compounds of formula I.

The materials present in the compositions according to the invention are those which are sensitive to oxidative, thermal and/or actinic degradation. Those organic materials are not to be understood as including living organisms.

The following may be mentioned as examples of organic materials that can be stabilised according to the invention with the aid of the compounds of formula I:

1. Polymers of mono- and di-olefins, for example polypropylene, polyisobutylene, polybutene-1, poly-4-methylpentene-1, polyisoprene or polybutadiene and also polymerisates of cycloolefins, such as, for example, of cyclopentene or norbornene; and also polyethylene (which may optionally be cross-linked), for example high density polyethylene (HDPE), low density polyethylene (LDPE), linear low density polyethylene (LLDPE), branched low density polyethylene (BLDPE).

Polyolefins, that is to say polymers of monoolefins, as mentioned by way of example in the preceding paragraph, especially polyethylene and polypropylene, can be prepared in accordance with various processes, especially in accordance with the following methods:

a) radically (usually at high pressure and high temperature);

b) by means of catalysts, the catalyst usually containing one or more metals of group IVb, Vb, VIb or VIII.

Those metals generally have one or more ligands, such as oxides, halides, alcoholates, esters, ethers, amines, alkyls, alkenyls and/or aryls, which may be either π- or σ-coordinated. Those metal complexes may be free or fixed to carriers, such as, for example, to activated magnesium chloride, titanium(III) chloride, aluminium oxide or silicon oxide. Those catalysts may be soluble or insoluble in the polymerisation medium. The catalysts can be active as such in the polymerisation or further activators may be used, such as, for example, metal alkyls, metal hydrides, metal alkyl halides, metal alkyl oxides or metal alkyl oxanes, the metals being elements of group(s) Ia, IIa and/or IIIa. The activators may be modified, for example, with further ester, ether, amine or silyl ether groups. Those catalyst systems are usually known as Phillips, Standard Oil Indiana, Ziegler (-Natta), TNZ (DuPont), metallocene or single site catalysts (SSC).

2. Mixtures of the polymers mentioned under 1), for example mixtures of polypropylene with polyisobutylene, polypropylene with polyethylene (for example PP/HDPE, PP/LDPE) and mixtures of different types of polyethylene (for example LDPE/HDPE).

3. Copolymers of mono- and di-olefins with one another or with other vinyl monomers, such as, for example, ethylene/propylene copolymers, linear low density polyethylene (LLDPE) and mixtures thereof with low density polyethylene (LDPE), propylene/butene-1 copolymers, propylene/isobutylene copolymers, ethylene/butene-1 copolymers, ethylene/hexene copolymers, ethylene/methylpentene copolymers, ethylene/heptene copolymers, ethylene/octene copolymers, propylene/butadiene copolymers, isobutylene/isoprene copolymers, ethylene/alkyl acrylate copolymers, ethylene/alkyl methacrylate copolymers, ethylene/vinyl acetate copolymers and copolymers thereof with carbon monoxide, or ethylene/acrylic acid copolymers and salts thereof (ionomers), and also terpolymers of ethylene with propylene and a diene, such as hexadiene, dicyclopentadiene or ethylidenenorbornene; and also mixtures of such copolymers with one another or with polymers mentioned under 1), for example polypropylene-ethylene/propylene copolymers, LDPE-ethylene/vinyl acetate copolymers, LDPE-ethylene/acrylic acid copolymers, LLDPE-ethylene/vinyl acetate copolymers, LLDPE-ethylene/acrylic acid copolymers and alternately or statistically structured polyalkylene-carbon monoxide copolymers and mixtures thereof with other polymers, such as, for example, polyamides.

4. Hydrocarbon resins (for example $C_5$–$C_9$) including hydrogenated modifications thereof (for example tackifier resins) and mixtures of polyalkylenes and starch.

5. Polystyrene, poly(p-methylstyrene), poly(α-methylstyrene).

6. Copolymers of styrene or α-methylstyrene with dienes or acrylic derivatives, such as, for example, styrene/butadiene, styrene/acrylonitrile, styrene/alkyl methacrylate, styrene/butadiene/alkyl acrylate and methacrylate, styrene/maleic acid anhydride, styrene/acrylonitrile/methyl acrylate; high-impact-strength mixtures consisting of styrene copolymers and another polymer, such as, for example, a polyacrylate, a diene polymer or an ethylene/propylene/diene terpolymer; and also block copolymers of styrene, such as, for example, styrene/butadiene/styrene, styrene/isoprene/styrene, styrene/ethylene-butylene/styrene or styrene/ethylene-propylene/styrene.

7. Graft copolymers of styrene or α-methylstyrene, such as, for example, styrene on polybutadiene, styrene on polybutadiene/styrene or polybutadiene/acrylonitrile copolymers, styrene and acrylonitrile (or methacrylonitrile) on polybutadiene; styrene, acrylonitrile and methyl methacrylate on polybutadiene; styrene and maleic acid anhydride on polybutadiene; styrene, acrylonitrile and maleic acid anhydride or maleic acid imide on polybutadiene; styrene and maleic acid imide on polybutadiene, styrene and alkyl acrylates or alkyl methacrylates on polybutadiene, styrene and acrylonitrile on ethylene/propylene/diene terpolymers, styrene and acrylonitrile on polyalkyl acrylates or polyalkyl methacrylates, styrene and acrylonitrile on acrylate/butadiene copolymers, and mixtures thereof with the copolymers mentioned under 6), such as those known, for example, as so-called ABS, MBS, ASA or AES polymers.

8. Halogen-containing polymers, such as, for example, polychloroprene, chlorocaoutchouc, chlorinated or chlorosulfonated polyethylene, copolymers of ethylene and chlorinated ethylene, epichlorohydrin homo- and co-polymers, especially polymers of halogen-containing vinyl compounds, such as, for example, polyvinyl chloride, polyvinylidene chloride, polyvinyl fluoride, polyvinylidene fluoride; and copolymers thereof, such as vinyl chloride/vinylidene chloride, vinyl chloride/vinyl acetate or vinylidene chloride/vinyl acetate.

9. Polymers derived from α,β-unsaturated acids and derivatives thereof, such as polyacrylates and polymethacrylates, or polymethyl methacrylates, polyacrylamides and polyacrylonitriles impact-resistant-modified with butyl acrylate.

10. Copolymers of the monomers mentioned under 9) with one another or with other unsaturated monomers, such as, for example, acrylonitrile/butadiene copolymers, acrylonitrile/alkyl acrylate copolymers, acrylonitrile/alkoxyalkyl acrylate copolymers, acrylonitrile/vinyl halide copolymers or acrylonitrile/alkyl methacrylate/butadiene terpolymers.

11. Polymers derived from unsaturated alcohols and amines or their acyl derivatives or acetals, such as polyvinyl alcohol, polyvinyl acetate, stearate, benzoate or maleate, polyvinylbutyral, polyallyl phthalate, polyallylmelamine; and the copolymers thereof with olefins mentioned in Point 1.

12. Homo- and co-polymers of cyclic ethers, such as polyalkylene glycols, polyethylene oxide, polypropylene oxide or copolymers thereof with bisglycidyl ethers.

13. Polyacetals, such as polyoxymethylene, and also those polyoxymethylenes which contain comonomers such as, for example, ethylene oxide; polyacetals that are modified with thermoplastic polyurethanes, acrylates or MBS.

14. Polyphenylene oxides and sulfides and mixtures thereof with styrene polymers or polyamides.

15. Polyurethanes derived from polyethers, polyesters and polybutadienes having terminal hydroxy groups on the one hand and aliphatic or aromatic polyisocyanates on the other hand, and their initial products.

16. Polyamides and copolyamides derived from diamines and dicarboxylic acids and/or from aminocarboxylic acids or the corresponding lactams, such as polyamide 4, polyamide 6, polyamide 6/6, 6/10, 6/9, 6/12, 4/6, 12/12, polyamide 11, polyamide 12, aromatic polyamides derived from m-xylene, diamine and adipic acid; polyamides prepared from hexamethylenediamine and iso- and/or tere-phthalic acid and optionally an elastomer as modifier, for example poly-2,4,4-trimethylhexamethyleneterephthalamide or poly-m-phenylene-isophthalamide. Block copolymers of the above-mentioned polyamides with polyolefins, olefin copolymers, ionomers or chemically bonded or grafted elastomers; or with polyethers, such as, for example, with polyethylene glycol, polypropylene glycol or polytetramethylene glycol. Also polyamides or copolyamides modified with EPDM or ABS; and polyamides condensed during processing ("RIM polyamide systems").

17. Polyureas, polyimides, polyamide imides and polybenzimidazoles.

18. Polyesters derived from dicarboxylic acids and dialcohols and/or from hydroxycarboxylic acids or the corresponding lactones, such as polyethylene terephthalate, polybutylene terephthalate, poly-1,4-dimethylolcyclohexane terephthalate, polyhydroxybenzoates, and also block polyether esters derived from polyethers with hydroxy terminal groups; and also polyesters modified with polycarbonates or MBS.

19. Polycarbonates and polyester carbonates.

20. Polysulfones, polyether sulfones and polyether ketones.

21. Cross-linked polymers derived from aldehydes on the one hand and phenols, urea or melamine on the other hand, such as phenol/formaldehyde, urea/formaldehyde and melamine/formaldehyde resins.

22. Drying and non-drying alkyd resins.

23. Unsaturated polyester resins derived from copolyesters of saturated and unsaturated dicarboxylic acids with polyvalent alcohols, and also vinyl compounds as cross-linking agents, such as also the halogen-containing, difficultly combustible modifications thereof.

24. Cross-linkable acrylic resins derived from substituted acrylic acid esters, such as, for example, from epoxy acrylates, urethane acrylates or polyester acrylates.

25. Alkyd resins, polyester resins and acrylate resins that are cross-linked with melamine resins, urea resins, polyisocyanates or epoxy resins.

26. Cross-linked epoxy resins derived from polyepoxides, for example from bis-glycidyl ethers or from cycloaliphatic diepoxides.

27. Natural polymers, such as cellulose, natural rubber, gelatin, and also the polymer-homologously chemically modified derivatives thereof, such as cellulose acetates, propionates and butyrates, and the cellulose ethers, such as methyl cellulose; and also colophonium resins and derivatives.

28. Mixtures (polyblends) of the afore-mentioned polymers, such as, for example, PP/EPDM, polyamide/EPDM or ABS, PVC/EVA, PVC/ABS, PVC/MBS, PC/ABS, PBTP/ABS, PC/ASA, PC/PBT, PVC/CPE, PVC/acrylates, POM/thermoplastic PUR, PC/thermoplastic PUR, POM/acrylate, POM/MBS, PPO/HIPS, PPO/PA 6.6 and copolymers, PA/HDPE, PA/PP, PA/PPO.

29. Natural and synthetic organic substances that are pure monomeric compounds or mixtures thereof, for example mineral oils, animal or vegetable fats, oils and waxes, or oils, waxes and fats based on synthetic esters (for example phthalates, adipates, phosphates or trimellitates), and mixtures of synthetic esters with mineral oils in any desired weight ratios, such as are used, for example, as spinning preparations, and the aqueous emulsions thereof.

30. Aqueous emulsions of natural or synthetic robbers, such as, for example, natural rubber latex or latices of carboxylated styrene/butadiene copolymers.

Incorporation into the materials can be effected, for example, by mixing in or applying the compounds of formula I and optionally further additives in accordance with the methods customary in the art. In the case of polymers, especially synthetic polymers, the incorporation can take place before or during shaping, or by application of the dissolved or dispersed compounds to the polymer, optionally with subsequent evaporation of the solvent. In the case of elastomers, they too can be stabilised in the form of latices. A further possible method of incorporating the compounds of formula I into polymers is their addition before, during or immediately after the polymerisation of the corresponding monomers or before cross-linking. In that case the compounds of formula I can be used as such but they may also be added in encapsulated form (for example in waxes, oils or polymers). In the case of addition before or during polymerisation, the compounds of formula I can also act as regulators for the chain length of the polymers (chain terminators).

The compounds of formula I or mixtures thereof can also be added to the plastics to be stabilised in the form of a master batch, which contains those compounds, for example, in a concentration of from 2.5 to 25% by weight.

The compounds of formula I can advantageously be incorporated in accordance with the following methods:

as an emulsion or dispersion (for example to latices or emulsion polymers);

as a dry mixture during the mixing of additional components or polymer mixtures;

by direct addition into the processing apparatus (for example extruder, kneader, etc.);

as a solution or melt.

Polymer compositions according to the invention can be used in a variety of forms or processed to form a variety of products, for example they may be used as (or processed to form) films, fibres, ribbons, moulding compounds, profiles, or as binders for surface-coatings, adhesives or cement.

The compositions according to the invention comprise as organic material preferably a lubricant, a metal-working fluid, a hydraulic fluid, or a natural, semi-synthetic or synthetic polymer. Halogen-free polymers are preferred. Special preference is given to compositions that comprise a halogen-free thermoplastic plastics or an elastomer. According to a further preferred form, the organic material is a polyolefin. Examples of such polymers can be found in the above list of suitable materials.

Preference is also given to compositions comprising as organic material a lubricant, a metal-working fluid or a hydraulic fluid, especially a lubricant.

The invention relates also to a method of stabilising organic material, especially thermoplastic polymers, elastomers or lubricants, hydraulic fluids or metal-working fluids, more especially lubricants, against oxidative, thermal and/or light-induced degradation, which method comprises adding compounds of formula I to that material, or applying them thereto, as stabilisers.

The compounds of formula I are suitable, for example, for imparting improved working properties to lubricants, hydraulic fluids or metal-working fluids. The invention therefore also includes compositions comprising a lubricant, hydraulic fluid or metal-working fluid and at least one compound of the general formula I, as described above.

The lubricants in question are based, for example, on mineral or synthetic oils or mixtures thereof or on vegetable and animal oils, fats and waxes. The lubricants are known to the person skilled in the art and are described in the relevant technical literature, for example in Dieter Klamann, "Schmierstoffe und verwandte Produkte" (Verlag Chemie, Weinheim, 1982), in Schewe-Kobek, "Das Schmiermittel-Taschenbuch" (Dr. Alfred Hüthig-Verlag, Heidelberg, 1974) and in "Ullmanns Enzyklopädie der technischen Chemie", Vol. 13, pages 85–94 (Verlag Chemie, Weinheim, 1977).

The lubricants are especially oils and fats, for example those based on a mineral oil. Oils are preferred.

The mineral oils are based especially on hydrocarbon compounds.

Examples of synthetic lubricants include lubricants based on aliphatic or aromatic carboxyl esters, polymeric esters, polyalkylene oxides, phosphoric acid esters, poly-α-olefins or silicones, a diester of a divalent acid with a monovalent alcohol, for example dioctyl sebacate or dinonyl adipate, a triester of trimethylolpropane with a monovalent acid or with a mixture of such acids, for example trimethylolpropane tripelargonate, trimethylolpropane tricaprylate or mixtures thereof, a tetraester of pentaerythritol with a monovalent acid or with a mixture of such acids, for example pentaerythritol tetracaprylate, or a complex ester of monovalent and divalent acids with polyvalent alcohols, for example a complex ester of trimethylolpropane with caprylic and sebacic acid or of a mixture thereof. In addition to mineral oils there are especially suitable, for example, poly-α-olefins, ester-based lubricants, phosphates, glycols, polyglycols and polyalkylene glycols, and mixtures thereof with water.

Vegetable lubricants that may be mentioned are the oils, fats and waxes obtained, for example, from olives, palms, palm kernels, beet, rape, linen, nuts, soybeans, cotton, castor oil plants, sunflowers, pumpkin seeds, coconut, maize or the modified forms thereof, for example sulfurised or epoxidised oils, such as epoxidised soybean oil, and mixtures of the substances. Examples of animal oils, fats and waxes that can be used as lubricants are tallows, fish oils, sperm oil, neat's foot oil, train oils and lard oils, and modified forms and mixtures thereof.

Metal-working fluids, such as rolling oils, drawing oils and cutting oils, are generally based on the above-described mineral oils and synthetic oils and can also be in the form of oil-in-water or water-in-oil emulsions. The same applies to hydraulic fluids. Further suitable lubricants, hydraulic fluids and metal-working fluids are, for example, compressor oils and spinning preparations.

The compounds of formula I, as described above, can be present in the lubricant, hydraulic fluid or metal-working fluid, for example, in amounts of from 0.01 to 10% by weight, advantageously in amounts from 0.05 to 5% by weight, preferably in an amount of from 0.05 to 3% by weight and more especially from 0.5 to 1.5% by weight, based on the composition.

The compounds of formula I can be mixed with the lubricants, hydraulic fluids and metal-working fluids in a manner known per se. For example, the compounds have good solubility in oils. It is also possible to prepare a so-called master batch which can be diluted with the lubricant in question or the hydraulic or metal-working fluid in question to give working concentrations appropriate to the use.

In addition to the compounds or mixtures according to the invention, the compositions according to the invention, especially when they comprise organic, especially synthetic, polymers, may also contain further customary additives. Examples of such additives are:

1. Antioxidants 1.1. Alkylated monophenols, for example 2,6-di-tert-butyl-4-methylphenol, 2-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-di-cyclopentyl-4-methylphenol, 2-(α-methylcyclohexyl) 4,6-dimethylphenol, 2,6-di-octadecyl-4-methylphenol, 2,4,6-tri-cyclohexylphenol, 2,6-di-tert-butyl-4-methoxymethylphenol, 2,6-di-nonyl-4-methylphenol, 2,4-dimethyl-6-(1'-methyl-undec-1'-yl)-phenol, 2,4-dimethyl-6-(1'-methyl-heptadec-1'-yl)-phenol, 2,4-dimethyl-6-(1'-methyl-tridec-1'-yl)-phenol and mixtures thereof.

1.2. Alkylthiomethylphenols, for example 2,4-di-octylthiomethyl-6-tert-butylphenol, 2,4-di-octylthiomethyl-6-methylphenol, 2,4-di-octylthiomethyl-6-ethylphenol, 2,6-di-dodecylthiomethyl-4-nonylphenol.

1.3. Hydroquinones and alkylated hydroquinones, for example 2,6-di-tert-butyl-4-methoxyphenol, 2,5-di-tert-butyl-hydroquinone, 2,5-di-tert-amyl-hydroquinone, 2,6-diphenyl-4octadecyloxyphenol, 2,6-di-tert-butyl-hydroquinone, 2,5-di-tert-butyl-4-hydroxyanisole, 3,5-di-tert-butyl-4-hydroxyanisole, 3,5-di-tert-butyl-4-hydroxyphenyl-stearate, bis(3,5-di-tert-butyl-4-hydroxyphenyl)adipate.

1.4. Hydroxylated thiodiphenyl ethers, for example 2,2'-thio-bis(6-tert-butyl-4-methylphenol), 2,2'-thiobis(4-octylphenol), 4,4'-thio-bis(6-tert-butyl-3-methylphenol), 4,4'-thiobis(6-tert-butyl-2-methylphenol), 4,4'-thio-bis(3,6-di-sec-amylphenol), 4,4'-bis(2,6-dimethyl-4-hydroxyphenyl) disulfide.

1.5. Alkylidene bisphenols, for example 2,2'-methylene-bis(6-tert-butyl-4-methylphenol), 2,2'-methylene-bis(6-tert-butyl-4-ethylphenol), 2,2'-methylene-bis[4-methyl-6-(α-methylcyclohexyl)-phenol], 2,2'-methylene-bis(4-methyl-6-cyclohexylphenol), 2,2'-methylene-bis(6-nonyl-4-methylphenol), 2,2'-methylene-bis(4,6-di-tert-butylphenol), 2,2'-ethylidene-bis(4,6-di-tert-butylphenol), 2,2'-ethylidene-bis-(6-tert-butyl-4-isobutylphenol), 2,2'-methylene-bis[6-(α-methylbenzyl)-4-nonylphenol], 2,2'-methylene-bis[6-(α,α-dimethylbenzyl)-4-nonylphenol], 4,4'-methylene-bis(2,6-di-tert-butylphenol), 4,4'-ethylene-bis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methylphenyl)-3-n-dodecylmercaptobutane, ethylene glycol bis[3,3-bis(3'-tert-butyl-4'-hydroxyphenyl)butyrate], bis(3-tert-butyl-4-hydroxy-5-methyl-phenyl)dicyclopentadiene, bis[2-(3'-tert-butyl-2'-hydroxy-5'-methyl-benzyl)-6-tert-butyl-4-methyl-phenyl]terephthalate, 1,1-bis(3,5-dimethyl-2-hydroxyphenyl)butane, 2,2-bis(3,5-di-tert-butyl-4-hydroxyphenyl)propane, 2,2-bis(5-tert-butyl- 4-hydroxy-2-methylphenyl)-4-n-dodecylmercapto-butane, 1,1,5,5-tetra(5-tert-butyl-4-hydroxy-2-methylphenyl)pentane.

1.6. O-, N- and S-benzyl compounds, for example 3,5,3',5'-tetra-tert-butyl-4,4'-dihydroxy-dibenzyl ether, octadecyl-4-hydroxy-3,5-dimethylbenzyl-mercaptoacetate, tris-(3,5-di-tert-butyl-4-hydroxybenzyl)amine, bis(4-tert-butyl-3-hydroxy-2,6-dimethylbenzyl)dithioterephthalate, bis(3,5-di-tert-butyl-4-hydroxybenzyl)sulfide, isooctyl-3,5-di-tert-butyl-4-hydroxybenzyl-mercaptoacetate.

1.7. Hydroxybenzylated malonates, for example dioctadecyl-2,2-bis(3,5-di-tert-butyl-2-hydroxybenzyl) malonate, di-octadecyl-2-(3-tert-butyl-4-hydroxy-5-methylbenzyl)malonate, di-dodecylmercaptoethyl-2,2-bis(3,5-di-tert-butyl-4-hydroxybenzyl) malonate, di[4-(1,1,3,3-tetramethylbutyl)-phenyl]-2,2-bis(3,5-di-tert-butyl-4-hydroxybenzyl)malonate.

1.8. Hydroxybenzyl aromatic compounds, for example 1,3,5-tris(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol.

1.9. Triazine compounds, for example 2,4-bis-octylmercapto-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris(3,5-di-tert-butyl-4-hydroxyphenoxy)-1,2,3-triazine, 1,3,5-tris(3,5-di-tert-butyl-4-hydroxybenzyl)isocyanurate, 1,3,5-tris-(4-tert-butyl-3-hydroxy-2,6-dimethylbenzyl) isocyanurate, 2,4,6-tris(3,5-di-tert-butyl-4-hydroxyphenylethyl)-1,3,5-triazine, 1,3,5-tris(3,5-di-tert-butyl-4-hydroxyphenylpropionyl)hexahydro-1,3,5-triazine, 1,3,5-tris(3,5-dicyclohexyl-4-hydroxybenzyl)isocyanurate.

1.10. Benzylphosphonates, for example dimethyl-2,5-di-tert-butyl-4-hydroxybenzyl phosphonate, diethyl-3,5-di-tert-butyl-4-hydroxybenzyl phosphonate, dioctadecyl-3,5-di-tert-butyl-4-hydroxybenzyl phosphonate, dioctadecyl-5-tert-butyl-4-hydroxy-3-methylbenzyl phosphonate, calcium salt of 3,5-di-tert-butyl-4-hydroxybenzyl-phosphonic acid monoethyl ester.

1.11. Acylaminophenols, for example 4-hydroxy-lauric acid anilide, 4-hydroxystearic acid anilide, N-(3,5-di-tert-butyl-4-hydroxyphenyl)-carbamic acid octyl ester.

1.12. Esters of β-(3,5-di-tert-butyl-4hydroxyphenyl)-propionic acid with mono- or poly-valent alcohols, such as, for example, with methanol, ethanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris-(hydroxyethyl)isocyanurate, N,N'-bis(hydroxyethyl)oxalic acid diamide, 3-thiaundecanol, 3-thiapentadecanol, trimethylhexanediol, trimethylolpropane, 4-hydroxymethyl-1-phospha-2,6,7-trioxabicyclo [2.2.2]octane.

1.13. Esters of β-(5-tert-butyl-4hydroxy-3-methylphenyl)-propionic acid with mono- or poly-valent alcohols, such as, for example, with methanol, ethanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxy)ethyl-isocyanurate, N,N'-bis(hydroxyethyl)oxalic acid diamide, 3-thiaundecanol, 3-thiapentadecanol, trimethylhexanediol, trimethylolpropane, 4-hydroxymethyl-1-phospha-2,6,7-trioxabicyclo [2.2.2]octane.

1.14. Esters of β-(3,5-dicyclohexyl-4-hydroxyphenol)-propionic acid with mono- or poly-valent alcohols, such as, for example, with methanol, ethanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxy)ethyl-isocyanurate, N,N'-bis(hydroxyethyl)oxalic acid diamide, 3-thiaundecanol, 3-thiapentadecanol, trimethylhexanediol, trimethylolpropane, 4-hydroxymethyl-1-phospha-2,6,7-trioxabicyclo [2.2.2]octane.

1.15. Esters of 3 5-di-tert-butyl-4-hydroxyphenylacetic acid with mono- or poly-valent alcohols, such as, for example, with methanol, ethanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris-(hydroxy)ethyl-isocyanurate, N,N'-bis(hydroxyethyl)oxalic acid diamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.16. Amides of β-(3,5-di-tert-butyl-4-hydroxyphenyl)-propionic acid, such as, for example, N,N'-bis(3,5-di-tert-butyl-4-hydroxyphenylpropionyl) hexamethylenediamine, N,N'-bis(3,5-di-tert-butyl-4-hydroxyphenylpropionyl)trimethylenediamine, N,N'-bis(3,5-di-tert-butyl-4-hydroxyphenylpropionyl) hydrazine.

2. UV-Absorbers and light-stabilising agents 2.1. 2-(2'-Hydroyphenyl)-benzotriazoles, such as, for example, 2-(2'-hydroxy-5'-methylphenyl)-benzotriazole, 2-(3',5'-di-tert-butyl-2'-hydroxyphenyl)-benzotriazole, 2-(5'-tert-butyl-2'-hydroxyphenyl)-benzotriazole, 2-(2'-hydroxy-5'-(1,1,3,3-tetramethylbutyl)phenyl)-benzotriazole, 2-(3',5'-di-tert-butyl-2'-hydroxyphenyl)-5-chloro-benzotriazole, 2-(3'-tert-butyl-2'-hydroxy-5'-methylphenyl)-5-chloro-benzotriazole, 2-(3'-sec-butyl-5'-tert-butyl-2'-hydroxyphenyl)-benzotriazole, 2-(2'-hydroxy-4'-octyloxyphenyl)-benzotriazole, 2-(3',5'-di-tert-amyl-2'-hydroxyphenyl)-benzotriazole, 2-(3',5'-bis(α, αbenzotriazole, mixture of 2-(3'-benzotriazole, mixture of 2-(3'-tert-butyl-2'-hydroxy-5'-(2-octyloxycarbonylethyl)phenyl)-5-chloro-benzotriazole, 2-(3'-tert-butyl-5'-[2-(2-ethylhexyloxy)-carbonylethyl]-2'-hydroxyphenyl)-5-chloro-benzotriazole, 2-(3'-tert-butyl-2'-hydroxy-5'-(2-methoxycarbonylethyl)phenyl)-5-chloro-benzotriazole, 2-(3'-tert-butyl-2'-hydroxy-5'-(2-methoxycarbonylethyl)phenyl)-benzotriazole, 2-(3'-tert-butyl-2'-hydroxy-5'-(2-octyloxycarbonylethyl) phenyl)-benzotriazole, 2-(3'-tert-butyl-5'- [2-(2-ethylhexyloxy)carbonylethyl]-2'-hydroxyphenyl)-benzotriazole, 2-(3'-dodecyl-2'-hydroxy-5'-methylphenyl)-benzotriazole, and 2-(3'-tert-butyl-2'-hydroxy-5'-(2-isooctyloxycarbonylethyl)phenyl-benzotriazole, 2,2'-methylene-bis-[4-(1,1,3,3-tetramethylbutyl)-6-benzbenzotriazol-2-yl-phenol]; transesterification product of 2-[3'-tert-butyl-5'-(2- methoxycarbonylethyl)-2'-hydroxy-phenyl]-benzotriazole with polyethylene glycol 300; [R—CH$_2$CH$_2$—CO—O—(CH$_2$)$_3$]$_2$ with R=3'-tert-butyl-4'-hydroxy-5'-2H-benzotriazol-2-yl-phenyl.

2.2. 2-Hydroxybenzophenones, such as, for example, the 4-hydroxy, 4-methoxy, 4-octyloxy, 4-decyloxy, 4-dodecyloxy, 4-benzyloxy, 4,2',4'-trihydroxy, 2'-hydroxy-4,4'-dimethoxy derivative.

2.3. Esters of unsubstituted or substituted benzoic acids, such as, for example, 4-tert-butyl-phenylsalicylate, phenylsalicylate, octylphenylsalicylate, dibenzoylresorcinol, bis(4-tert-butylbenzoyl) resorcinol, benzoylresorcinol, 3,5-di-tert-butyl-4-hydroxybenzoic acid-2,4-di-tert-butylphenyl ester, 3,5-di-tert-butyl-4-hydroxybenzoic acid hexadecyl ester, 3,5-di-tert-butyl-4-hydroxybenzoic acid octadecyl ester, 3,5-di-tert-butyl-4-hydroxybenzoic acid-2-methyl-4,6-di-tert-butylphenyl ester.

2.4. Acrylates, such as, for example, α-cyano-β,β-diphenylacrylic acid ethyl ester or isooctyl ester, α-methoxycarbonyl-cinnamic acid methyl ester, α-cyano-β-methyl-p-methoxy-cinnamic acid methyl ester or butyl ester, α-methoxycarbonyl-p-methoxy-cinnamic acid methyl ester, N-(β-methoxycarbonyl-β-cyanovinyl)-2-methyl-indoline.

2.5. Nickel compounds, such as, for example, nickel complexes of 2,2'-thio-bis[4-(1,1,3,3-tetramethylbutyl) phenol], such as the 1:1 or 1:2 complex, optionally with additional ligands, such as n-butylamine, triethanolamine or N-cyclohexyldiethanolamine, nickel dibutyl dithiocarbamate, nickel salts of 4-hydroxy-3,5-di-tert-butylbenzylphosphonic acid monoalkyl esters, such as of the methyl or ethyl ester, nickel complexes of ketoximes, such as 2-hydroxy-4-methylphenylundecyl ketoxime, nickel complexes of 1-phenyl-4-lauroyl-5-hydroxypyrazole, optionally with additional ligands.

2.6. Sterically hindered amines, such as, for example, bis(2,2,6,6-tetramethyl-piperidyl)sebacate, bis(2,2,6,6-tetramethyl-piperidyl)succinate, bis(1,2,2,6,6-pentamethyl-piperidyl)sebacate, n-butyl-3,5-di-tert-butyl-4-hydroxybenzylmalonic acid bis(1,2,2,6,6-pentamethylpiperidyl) ester, condensation product of 1-hydroxyethyl-2,2,6,6-tetramethyl-4-hydroxypiperidine and succinic acid, condensation product of N,N'-bis(2,2,6,6-tetramethyl-4-piperidyl) hexamethylenediamine and 4-tert-octylamino-2,6-dichloro-1,3,5-s-triazine, tris(2,2,6,6-tetramethyl-4-piperidyl)nitrilotriacetate, tetrakis(2,2,6,6-tetramethyl-4-piperidyl)-1,2,3,4-butanetetraoate, 1,1'-(1,2-ethanediyl)-bis(3,3,5,5-tetramethyl-piperazinone), 4-benzoyl-2,2,6,6-tetramethylpiperidine, 4-stearyloxy-2,2,6,6-tetrarnethylpiperidine, bis(1,2,2,6,6-pentamethylpiperidyl)-2-n-butyl-2-(2-hydroxy-3,5-di-tert-butylbenzyl)-malonate, 3-n-octyl-7,7,9,9-tetrarnethyl-1,3,8-triazaspiro[4.5]decane-2,4-dione, bis(1-octyloxy-2,2,6,6-tetramethylpiperidyl)sebacate, bis(1-octyloxy-2,2,6,6-tetramethyl-piperidyl) succinate, condensation product of N,N'-bis(2,2,6,6-tetramethyl-4-piperidyl)-hexamethylenediamine and 4-morpholino-2,6-dichloro-1,3,5-triazine, condensation product of 2-chloro-4,6-di(4-n-butylamino-2,2,6,6-tetramethyl-piperidyl)-1,3,5-triazine and 1,2-bis(3-aminopropylamino)ethane, condensation product of 2-chloro-4,6-di(4-n-butylamino-1,2,2,6,6-pentamethylpiperidyl)-1,3,5-triazine and 1,2-bis(3-aminopropylamino)ethane, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl) pyrrolidine-2,5-dione, 3-dodecyl-1-(1,2,2,6,6-pentamethyl-4-piperidyl)-pyrrolidine-2,5-dione.

2.7. Oxalic acid diamides, such as, for example, 4,4'-dioctyloxy-oxanilide, 2,2'-di-octyloxy-5,5'-di-tert-butyl-oxanilide, 2,2'-di-dodecyloxy-5,5'-di-tert-butyl-oxanilide, 2-ethoxy-2'-ethyl-oxanilide, N,N'-bis(3-dimethylaminopropyl)oxalamide, 2-ethoxy-5-tert-butyl-2'-ethyloxanilide and a mixture thereof with 2-ethoxy-2'-ethyl-5,4'-di-tert-butyl-oxanilide, mixtures of o- and p-methoxy- and of o- and p-ethoxy-disubstituted oxanilides.

2.8. 2-(2-Hydroxyphenyl)-1,3,5-triazines, such as, for example, 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-[2-hydroxy-4-(2-hydroxy-3-butyloxy-propyloxy)phenyl]-4,6-bis(2,4-dimethylphenyl)-1,3,5-triazine, 2-[2-hydroxy-4-(2-hydroxy-3-octyloxypropyloxy)phenyl]-4,6-bis(2,4-dimethylphenyl)-1,3,5-triazine.

3. Metal deactivators, such as, for example, N,N'-diphenyloxalic acid diamide, N-salicylal-N'-salicyloylhydrazine, N,N'-bis(salicyloyl)hydrazine, N,N'-bis(3,5-di-tert-butyl-4-hydroxyphenylpropionyl)hydrazine, 3-salicyloylamino-1,2,4-triazole, bis(benzylidene)oxalic acid dihydrazide, oxanilide, isophthalic acid dihydrazide, sebacic acid bis-phenylhydrazide, N,N'-diacetyl-adipic acid dihydrazide, N,N'-bis-salicyloyloxalic acid dihydrazide, N,N'-bis-salicyloyl-thiopropionic acid dihydrazide.

4. Phosphites and phosphonites, such as, for example, triphenylphosphite, diphenylalkylphosphites, phenyldialkylphosphites, tris(nonylphenyl)phosphite, trilaurylphosphite, trioctadecylphosphite, distearyl-pentaerythritol diphosphite, tris(2,4-di-tert-butyl-phenyl) phosphite, diisodecylpentaerythritol diphosphite, bis(2,4-di-tert-butylphenyl)pentaerythritol diphosphite, bis(2,6-di-tert-butyl-4-methylphenyl)pentaerythritol diphosphite, bisisodecyloxy-pentaerythritol diphosphitemethylpb 2,4-di-tert-butyl-6-methylphenyl)pentaerythritol diphosphite, bis (2,4,6-tri-tert-butylphenyl)pentaerythritol diphosphite, tristearyl-sorbitol triphosphite, tetrakis(2,4-di-tert-butyl-phenyl)-4,4'-biphenylene diphosphonite, 6-isooctyloxy-2,4,8,10-tetra-tert-butyl-12H-dibenz[d,g]-1,3,2-dioxaphosphocine, 6-fluoro-2,4,8,10-tetra-tert-butyl-12-methyl-dibenz[d,g]1,3,2-dioxaphosphocine, bis(2,4-di-tert-butyl-6-methylphenyl)methylphosphite, bis(2,4-di-tert-butyl-6-methylphenyl)ethylphosphite.

5. Peroxide-decomposing compounds, such as, for example, esters of β-thio-dipropionic acid, for example of lauryl, stearyl, myristyl or tridecyl esters, mercaptobenzimidazole, the zinc salt of 2-mercaptobenzimidazole, zinc dibutyl dithiocarbamate, dioctadecyl disulfide, pentaerythritol tetrakis(β-dodecylmercapto)propionate.

6. Polyamide stabilisers, such as, for example, copper salts in combination with iodides and/or phosphorus compounds and salts of divalent manganese.

7. Basic co-stabilisers, such as, for example, melamine, polyvinylpyrrolidone, dicyandiamide, triallyl cyanurate, urea derivatives, hydrazine derivatives, amines, polyamides, polyurethanes, alkali metal and alkaline earth metal salts of higher fatty acids, for example calcium stearate, zinc stearate, magnesium behenate, magnesium stearate, sodium ricinoleate, potassium palmitate, antimony pyrocatecholate or tin pyrocatecholate.

8. Nucleation agents, such as, for example, 4-tert-butylbenzoic acid, adipic acid, diphenylacetic acid.

9. Fillers and reinforcers, such as, for example, calcium carbonate, silicates, glass fibres, asbestos, talc, kaolin, mica, barium sulfate, metal oxides and hydroxides, carbon black, graphite.

10. Other additives, such as, for example, plasticisers, glidants, emulsifiers, pigments, optical brighteners, flame-proofing agents, antistatic agents, propellants.

11. Benzofuranones and indolinones, such as those described, for example, in U.S. Pat. Nos. 4,325,863, 4,338, 244 or 5,175,312, or 3-[4-(2-acetoxyethoxy)phenyl]-5,7-di-tert-butyl-benzofuran-2-one, 5,7-di-tert-butyl-3-[4-(2-stearoyloxyethoxy)phenyl]-benzofuran-2-one, 3,3'-bis[5,7-di-tert-butyl-3-(4-[2-hydroxyethoxy]phenyl)-benzofuran-2-one], 5,7-di-tert-butyl-3-(4-ethoxyphenyl)benzofuran-2-one, 3-(4-acetoxy-3,5-dimethylphenyl)-5,7-di-tert-butyl-benzofuran-2-one, 3-(3,5-dimethyl-4-pivaloyloxy-phenyl)-5,7-di-tert-butyl-benzofuran-2-one.

When the compositions according to the invention are those based on lubricants and hydraulic fluids or metal-working fluids, they may likewise comprise further additives which are added in order to improve certain working properties, such as, for example, further anti-oxidants, metal deactivators, rust inhibitors, viscosity index enhancers, pour-point depressors, dispersants/surfactants and anti-wear additives. Examples thereof are:

Examples of phenolic anti-oxidants: These may be found under points 1.1 to 1.16 above.

Examples of aminic anti-oxidants: N,N'-di-isopropyl-p-phenylenediamine, N,N'-di-sec-butyl-p-phenylenediamine, N,N'-bis(1,4-dimethyl-pentyl)-p-phenylenediamine, N,N'-bis(1-ethyl-3-methyl-pentyl)-p-phenylenediamine, N,N'-bis(1-methyl-heptyl)-p-phenylenediamine, N,N'-dicyclohexyl-p-phenylenediamine, N,N'-diphenyl-p-phenylenediamine, N,N'-di(naphthyl-2)-p-phenylenediamine, N-isopropyl-N'-phenyl-p-phenylenediamine, N-(1,3-dimethyl-butyl)-N'-phenyl-p-phenylenediamine, N-(1-methyl-heptyl)-N'-phenyl-p-phenylenediamine, N-cyclohexyl-N'-phenyl-p-phenylenediamine, 4-(p-toluene-sulfonamido)-diphenylamine, N,N'-dimethyl-N,N'-di-sec-butyl-p-phenylenediamine, diphenylamine, N-allyldiphenylamine, 4-isopropoxy-diphenylamine, N-phenyl-1-naphthylamine, N-phenyl-2-naphthylamine, octylated diphenylamine, for example p,p'-di-tert-octyldiphenylamine, 4-n-butylaminophenol, 4-butyrylamino-phenol, 4-nonanoylamino-phenol, 4-dodecanoylamino-phenol, 4-octadecanoylamino-phenol, di(4-methoxyphenyl)amine, 2,6-di-tert-butyl-4-dimethylamino-methyl-phenol, 2,4'-diamino-diphenylmethane, 4,4'-diamino-diphenylmethane, N,N,N',N'-tetramethyl-4,4'-diamino-diphenylmethane, 1,2-di[(2-methyl-phenyl)-amino]ethane, 1,2-di(phenylamino) propane, (o-tolyl)-biguanide, mixture of mono- and di-alkylated tert-butyl/tert-octyldiphenylamines, mixture of mono- and di-alkylated isopropyl/isohexyl-diphenylamines, mixtures of mono- and di-alkylated tert-butyldiphenylamines, 2,3-dihydro-3,3-dimethyl-4H-1,4-benzothiazine, phenothiazine, N-allylphenothiazine, N,N,N',N'-tetraphenyl-1,4-diamino-but-2-ene, N,N-bis(2,2,6,6-tetramethyl-piperidin-4-yl-hexamethylenediamine, bis(2,2,6,6-tetramethylpiperidin-4-yl)sebacate, 2,2,6,6-tetramethylpiperidin-4-one, 2,2,6,6-tetramethylpiperidin-4-ol.

Examples of further anti-oxidants: Aliphatic or aromatic phosphites, esters of thiodipropionic acid or of thiodiacetic acid, or salts of dithiocarbamic or dithiophosphoric acid, 2,2,12,12-tetramethyl-5,9-dihydroxy-3,7,11-trithiatridecane and 2,2,15,15-tetramethyl-5,12-dihydroxy-3,7,10,14-tetrathiahexadecane.

Examples of metal deactivators, for example for copper, are:

a) Benzotriazoles and derivatives thereof, for example 4- or 5-alkylbenzotriazoles (for example tolutriazole) and derivatives thereof, 4,5,6,7-tetrahydrobenzotriazole, 5,5'-methylenebis-benzotriazole; Mannich bases of benzotriazole or tolutriazole, such as 1-[di(2-ethylhexyl)aminomethyl]tolutriazole and 1-[di(2-ethylhexyl)aminomethyl)benzotriazole; alkoxyalkylbenzotriazoles, such as 1-(nonyloxymethyl)-benzotriazole, 1-(1-butoxyethyl)-benzotriazole and 1-(1-cyclohexyloxybutyl)-tolutriazole.

b) 1,2,4-Triazoles and derivatives thereof, for example 3-alkyl(or aryl)-1,2,4-triazoles, Mannich bases of 1,2,4-triazoles, such as 1-[di(2-ethylhexyl)aminomethyl-1,2,4-triazole; alkoxyalkyl-1,2,4-triazoles, such as 1-(1-butoxyethyl-1,2,4-triazole; acylated 3-amino-1,2,4-triazoles.

c) Imidazole derivatives, for example 4,4'-methylene-bis (2-undecyl-5-methylimidazole, bis[(N-methyl) imidazol-2-yl]carbinol-octyl ether.

d) Sulfur-containing heterocyclic compounds, for example 2-mercaptobenzothiazole, 2,5-dimercapto-1,3,4-thiadiazole and derivatives thereof; 3,5-bis[di(2-ethylhexyl)amino-methyl]-1,3,4-thiadiazolin-2-one.

e) Amino compounds, for example salicylidene-propylenediamine, salicylamino-guanidine and salts thereof.

Examples of rust inhibitors are:

a) Organic acids, their esters, metal salts, amine salts and anhydrides, for example alkyl- and alkenyl-succinic acids and their partial esters with alcohols, diols or hydroxycarboxylic acids, partial amides of alkyl- and alkenyl-succinic acids, 4-nonylphenoxyacetic acid, alkoxy- and alkoxyethoxy-carboxylic acids, such as dodecyloxyacetic acid, dodecyloxy(ethoxy)-acetic acid and amine salts thereof, and also N-oleoyl-sarcosine, sorbitan mono-oleate, lead naphthenate, alkenylsuccinic acid anhydrides, for example dodecenylsuccinic acid anhydride, 2-carboxymethyl-1-dodecyl-3-methylglycerol and amine salts thereof.

b) Nitrogen-containing compounds, for example:
  i. Primary, secondary or tertiary aliphatic or cycloaliphatic amines and amine salts of organic and inorganic acids, for example oil-soluble alkylammonium carboxylates, and also 1-[N,N-bis(2-hydroxyethyl)amino]-3-(4-nonylphenoxy)propan-2-ol.
  ii. Heterocyclic compounds, for example: substituted imidazolines and oxazolines, 2-heptadecenyl-1-(2-hydroxyethyl)-imidazoline.

c) Phosphorus-containing compounds, for example: amine salts of phosphoric acid partial esters or phosphonic acid partial esters, zinc dialkyl dithiophosphates.

d) Sulfur-containing compounds, for example: barium dinonylnaphthalenesulfonates, calcium petroleum sulfonates, alkylthio-substituted aliphatic carboxylic acids, esters of aliphatic 2-sulfocarboxylic acids and salts thereof.

e) Glycerol derivatives, for example: glycerol monooleate, 1-(alkylphenoxy)-3-(2-hydroxyethyl) glycerols, 1-(alkylphenoxy)-3-(2,3-dihydroxypropyl) glycerols, 2-carboxyalkyl-1,3-dialkylglycerols.

Examples of viscosity index enhancers are: polyacrylates, polymethacrylates, vinyl pyrrolidone/methacrylate copolymers, polyvinylpyrrolidones, polybutenes, olefin copolymers, styrene/acrylate copolymers, polyethers.

Examples of pour-point depressors are: polymethacrylate, alkylated naphthalene derivatives.

Examples of dispersants/surfactants are: polybutenylsuccinic acid amides or imides, polybutenylphosphonic acid derivatives, basic magnesium, calcium and barium sulfonates and phenolates.

Examples of anti-wear additives are: Sulfur- and/or phosphorus- and/or halogen-containing compounds, such as sulfurised olefins and vegetable oils, zinc diaikyl dithiophosphates, alkylated triphenylphosphates, tritolyl phosphate, tricresyl phosphate, chlorinated paraffins, alkyl- and aryl-di- and -tri-sulfides, amine salts of mono- and di-alkyl phosphates, amine salts of methylphosphonic acid, diethanolaminomethyltolyltriazole, di(2-ethylhexyl) aminomethyltolyltriazole, derivatives of 2,5-dimercapto-1,3,4-thiadiazole, 3-[(bis-isopropyloxy-phosphinothioyl)thio]-propionic acid ethyl ester, triphenylthiophosphate (triphenylphosphorothioate), tris(alkylphenyl) phosphorothioates and mixtures thereof, (for example tris (isononylphenyl)phosphorothioate), diphenyl-monononylphenyl-phosphorothioate, isobutylphenyl-diphenyl-phosphorothioate, the dodecylamine salt of 3-hydroxy-1,3-thiaphosphetane-3-oxide, trithiophosphoric acid-5,5,5-tris[isooctylacetate (2)], derivatives of 2-mercaptobenzothiazole, such as 1-[N,N-bis(2-ethylhexyl) aminomethyl-2-mercapto-1H-1,3-benzothiazole, ethoxycarbonyl-5-octyl-dithiocarbamate.

The present invention relates also to the use of compounds of formula I for stabilising organic material that is sensitive to oxidative, thermal and/or light-induced degradation, especially natural or (semi)synthetic polymers, or lubricants, hydraulic fluids or metal-working fluids, more especially lubricants.

The invention relates accordingly also to a method of stabilising organic material, especially lubricants, metal-working fluids and hydraulic fluids, and also natural, synthetic or semi-synthetic polymers, which method comprises adding compounds of formula I as stabilisers to that material or applying them thereto.

Since it is often necessary to add several additives to a substrate, solubility problems may arise. These relate especially to applications in oils and liquid polymers. The compounds according to the invention exhibit good properties also in this respect.

As already mentioned, the invention relates also to novel compounds of formula I described at the beginning, with the exclusion of compounds of formula Ib

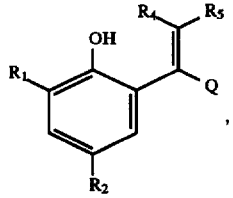

wherein $R_1$ is tert-butyl, $R_2$ is methyl, $R_4$, $R_5$ are each hydrogen and Q is phenyl, $R_1$ is tert-butyl, $R_2$, $R_4$, $R_5$ are each hydrogen and Q is phenyl, $R_2$ is methyl, $R_1$, $R_4$, $R_5$ are each hydrogen and Q is phenyl, $R_1$ is tert-butyl, $R_2$ is tert-butyl, $R_4$, $R_5$ are each methyl and Q is phenyl, $R_1$ is methyl, $R_2$, $R_4$, $R_5$ are each hydrogen and Q is phenyl, or $R_1$ is hydrogen, $R_2$ is tert-butyl, $R_4$, $R_5$ are each hydrogen and Q is phenyl, and the compounds of formula I described at the beginning, with the proviso that $R_1$ and $R_2$ are not alkyl when R and $R_3$ are hydrogen, n is the number one and $R_3O$ is in the ortho-position to the alkenyl group.

Preference is given to novel compounds of formula I wherein $R_1$ is hydrogen, $C_1$–$C_{12}$alkyl, cyclohexyl, phenyl, benzyl, α-methylbenzyl, α,α-dimethylbenzyl or a group of formula II, X is a group >CHR$_{17}$ or —S—, p is 0 to 4, $R'_1$ is $C_1$–$C_{12}$alkyl, $R_2$ is hydrogen, $C_1$–$C_8$alkyl, cyclohexyl, benzyl, α-methylbenzyl, α,α-dimethylbenzyl or phenyl or is a radical of formula III, Y is —S— or >CR$_{19}$R$_{20}$, >C(CH$_3$)—CH$_2$—CO—R$_9$, or $R_2$ is a radical of formula IV, Z=—O— or —S— and d=2, or $R_2$ is —(CH$_2$)$_2$—CO—OR$_{10}$, $R_3$ is hydrogen, $C_1$–$C_8$alkyl, phenyl or —CO—R$_8$ or is a radical of the formula V wherein $R_1$ is hydrogen, x is 2 to 6, $R_4$ and $R_5$ are each independently of the other hydrogen, $C_1$–$C_8$alkyl, phenyl, benzyl, α-methylbenzyl or α,α-dimethylbenzyl, $R_6$ is —NO$_2$, —C≡N, —COOR$_{13}$, —CO—R$_{16}$, —SO—R$_{14}$, —SO$_2$—R$_{14}$, or fluorine, $R_8$ is $C_1$–$C_8$alkyl or phenyl, $R_9$ is $C_1$–$C_{18}$alkyl, $R_{10}$ is hydrogen or $C_1$–$C_{18}$alkyl, $R_{11}$ is $C_1$–$C_4$alkyl, $R_{13}$ is $C_1$–$C_{12}$alkyl, $R_{14}$ is $C_4$–$C_8$alkyl or phenyl, $R_{17}$ is hydrogen, $C_1$–$C_4$alkyl or phenyl, $R_{19}$ is hydrogen or $C_1$–$C_4$alkyl and $R_{20}$ is hydrogen or $C_1$–$C_4$alkyl, with the exclusion of compounds of formula Ib

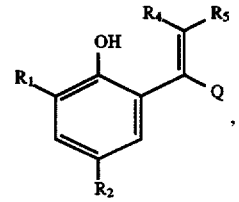

wherein, $R_1$ is tert-butyl, $R_2$ is methyl, $R_4$, $R_5$ are each hydrogen and Q is phenyl, $R_1$ is tert-butyl, $R_2$, $R_4$, $R_5$ are each hydrogen and Q is phenyl, $R_2$ is methyl, $R_1$, $R_4$, $R_5$ are each hydrogen and Q is phenyl, $R_1$ is tert-butyl, $R_2$ is tert-butyl, $R_4$, $R_5$ are each methyl and Q is phenyl, $R_1$ is methyl, $R_2$, $R_4$, $R_5$ are each hydrogen and Q is phenyl, or $R_1$ is hydrogen, $R_2$ is tert-butyl, $R_4$, $R_5$ are each hydrogen and Q is phenyl.

Preferred compounds of formula I, as described above, result in preferred compositions.

The invention relates also to compounds of formula I described at the beginning wherein k is 1 or 2.

The preparation of the compounds according to the invention and of the phenylalkenyl compounds used in the compositions according to the invention is carried out in accordance with the methods customary in organic chemistry, for example in accordance with the procedures described in A. Nishinage et al., J. Org Chem 51 2257 (1986), and G. Casiraghi et al., Synthesis 1977, 122:

Generally, 4-alkenyl-2,6-di-tert-butylphenols and 2-alkenyl-4,6-di-tert-butylphenols are prepared, for example, according to A. Nishinage et al., J. Org. Chem. 51, 2257 (1986):

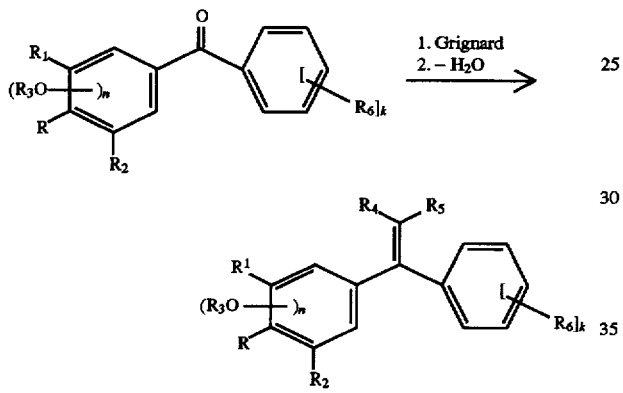

In that procedure the carbonyl group is reduced after the addition of a corresponding Grignard compound, as described for the experiment in Example 4 below.

When Q is phenyl or substituted phenyl, it is also possible to use the following procedure (G. Casiraghi et al., Synthesis 1977, 122):

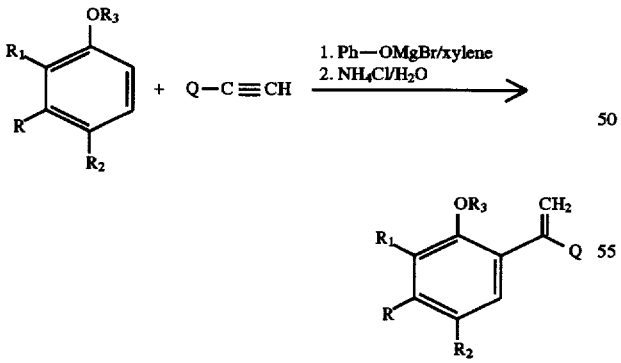

Orthoalkenylphenols can also be obtained via aluminium phenoxides in accordance with the method described by G. Casiraghi et at., J. Chem. Soc. Perkin I, 2027.

The reactions are advantageously carried out with the addition of customary solvents that are inert under the reaction conditions. The sulfur-containing products can be oxidised to the corresponding sulfoxide and sulfone compounds using oxidising agents. A suitable oxidising agent for that purpose is, for example, m-chloroperbenzoic acid.

It is, of course, possible, after the ring structure is complete, for substituents to be converted or introduced in accordance with customary procedures known in organic chemistry. Some of the preparation processes described are explained in detail in the Examples that follow. The starting compounds required for the preparation processes described above are known, commercially available or can be prepared in a manner known per se according to customary methods.

The Examples that follow illustrate the invention in greater detail. Unless otherwise indicated, in the Examples and in the rest of the description parts and percentages are parts by weight and percentages by weight. In the structural formulae given in the Examples, in customary manner the hydrogen atoms have generally not been shown, so that "=" represents =$CH_2$, "—" represents methyl,

represents tert-octyl and "+" represents tert-butyl.

EXAMPLE 1

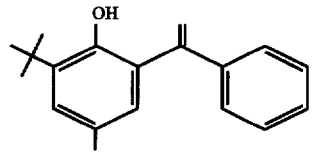

2.43 g (0.1 mol) of magnesium are placed in 50 ml of absolute diethyl ether at room temperature. 10.9 ml (0.1 mol) of ethyl bromide are slowly added dropwise over a period of 30 minutes. The Grignard reaction proceeds exothermically, and cooling is effected in an ice-bath. 32.8 g (0.2 mol) of 2-tert-butyl-4-methyl-phenol are added dropwise to the slightly turbid solution over a period of 30 minutes while cooling with an ice bath. Ethane is evolved exothermically. After 30 minutes' further reaction, 100 ml of absolute xylene are added and the mixture is heated at 135°–140° C. with the diethyl ether being distilled off simultaneously. After 20.4 g (0.2 mol) of phenylacetylene have been metered in, again over a period of 30 minutes, the mixture is left at reflux at 140° C. for 4 hours. After cooling to room temperature, saturated ammonium chloride solution is carefully added. The organic phase is separated off and dried over 10 g of anhydrous sodium sulfate.

After concentration by evaporation under reduced pressure, 48.2 g of a slightly yellowish oil is obtained which is distilled in vacuo.

Yield 36.2 g (68% of theory), colourless oil.

B.p. 130°–135° C. at $10^{-2}$ torr (corresponds to 1.33 kg $m^{-1}s^{-2}$).

Analogously to Example 1, the following two products are obtained:

EXAMPLE 2

(Compound 2, Table 1)

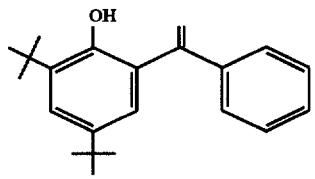

41.2 g of 2,4-di-tert-butylphenol yield 38.5 g (62.5% of theory) of colourless oil.

EXAMPLE 3

(Compound 3, Table 1)

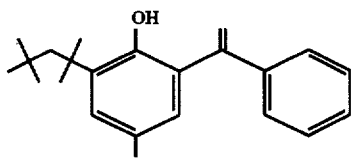

4.0 g of 4-methyl-2-tert-octylphenol yield 42.1 g (67.5% of theory) of colourless oil.

EXAMPLE 4

(Compound 4, Table 1)

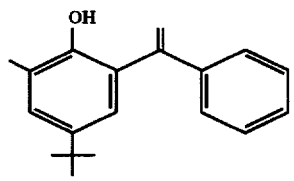

32.9 g (0.2 mol) of 2-methyl-4-tert-butyl-phenyl and 0.4 g (0.015 mol) of aluminium are prepared and heated at 230° C. After 15 minutes, a slight evolution of hydrogen begins. After one hour, the slightly turbid brown melt is cooled to about 100° C.; 100 ml of absolute xylene are added and the mixture is heated at reflux. After a solution of 24.0 g (0.2 mol) of acetophenone in 50 ml of absolute xylene has been metered in over a period of one hour, the mixture is boiled at reflux for 16 hours. After cooling to room temperature, the batch is slightly acidified with dilute hydrochloric acid, washed with 3×100 ml of water in a separating funnel, and the combined organic phases are dried over 12 g of anhydrous sodium sulfate and concentrated under reduced pressure. After column chromatography, 11.2 g (21% of theory) of a colourless oil are obtained.

EXAMPLE 5

(Compound 5, Table 1)

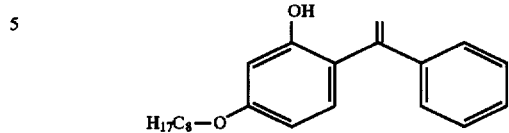

7.3 g (0.3 mol) of magnesium are placed in 200 ml of diethyl ether. 42.6 g (0.3 mol) of methyl iodide are added dropwise in the course of one hour at room temperature with cooling in an ice bath. The reaction proceeds exothermically. After 30 minutes' further reaction time, a solution of 32.5 g of the compound

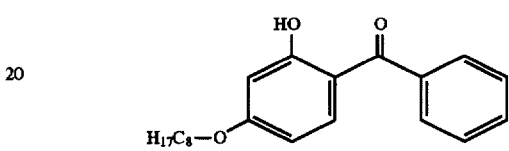

(available as Chimassorb® 81) in 100 ml of diethyl ether is carefully added dropwise within a period of one hour. The evolution of methane gas proceeds exothermically. After one hour's stirring, 100 ml of saturated ammonium chloride solution are added dropwise. The organic phase is separated off and dried over anhydrous $Na_2SO_4$. After concentration under reduced pressure, a slightly yellowish clear oil remains behind which is maintained at 120° C. for one hour at 20 mbar, the water formed being distilled off. 31.4 g (97% of theory) of a slightly yellowish, clear oil are obtained.

The following two products are obtained analogously:

EXAMPLE 6

(Compound 6, Table 1)

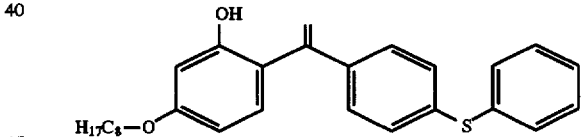

43.4 g of the compound

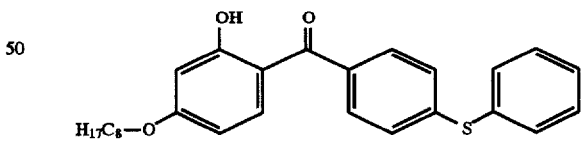

yield 42.7 g (99% of theory) of a slightly yellowish oil.

EXAMPLE 7

(Compound 7, Table 1)

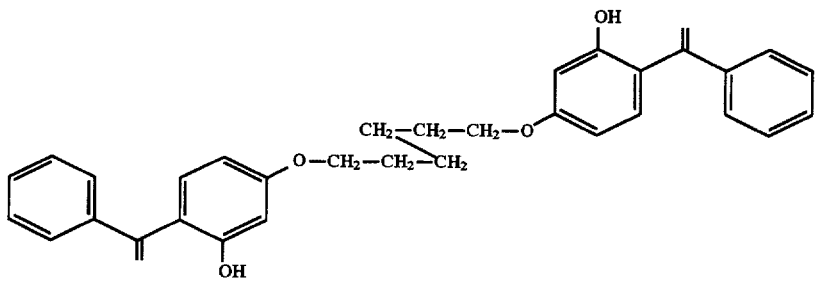

The reaction of 15.3 g (0.03 mol of the compound

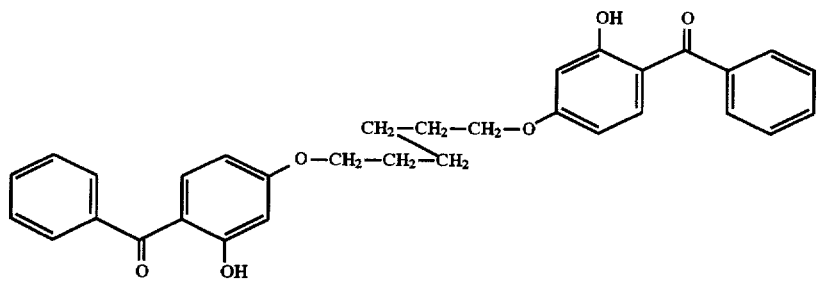

available as Seesorb®1000) yields 15.0.g (99% of theory) of a white powder.

EXAMPLE 8

(Compound 8, Table 1)

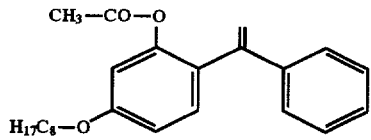

9.73 g (0.03 mol) of the compound from Example 5 and 3.34 g (0.033 mol) of triethylamine are placed in 20 ml of toluene. At 0° to 10° C., 2.36 g (0.03 mol) of acetyl chloride are added dropwise within a period of 30 minutes. The reaction proceeds exothermically, and a white solid is precipitated. After 3 hours' further reaction time at room temperature, the white crystal mass is filtered through a suction-filter and then washed with 30 ml of toluene. After concentration of the filtrate by evaporation in a rotary evaporator, a virtually colourless oil is obtained.

Yield: 8.7 g (76% of theory), almost colourless oil.

EXAMPLE 9

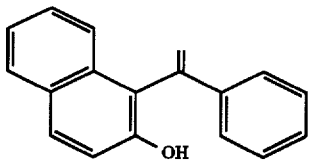

2.43 g (0.1 mol) of magnesium are placed in 50 ml of absolute diethyl ether at room temperature. 12.3 ml (0.1 mol) of 1-bromopropane are slowly added dropwise over a period of 30 minutes. The Grignard reaction proceeds exothermically, and cooling is effected in an ice bath. 28.8 g (0.2 mol) of 2-naphthol dissolved in 50 ml of absolute ether are added dropwise to the slightly turbid solution over a period of 30 minutes. Propane is evolved exothermically. After 30 minutes' further reaction, a solution of 20.4 g (0.2 mol) of phenylacetylene in 100 ml of absolute xylene is metered in over a period of 30 minutes. With the diethyl ether being distilled off simultaneously, the mixture is heated at 135°–140° C. and left at reflux at 140° C. for 4 hours. After cooling to room temperature, saturated ammonium chloride solution is carefully added. The organic phase is separated off and dried over 10 g of anhydrous sodium sulfate. After concentration by evaporation under reduced pressure, 47 g of a brown oil are obtained which is crystallised from hexane.

Yield 22.6 g (46% of theory), slightly beige powder m.p. 103° 108° C.

TABLE 1
| No. | Compound | B.p. °C. | [calculated/found] % C | H |
|---|---|---|---|---|
| 1 | | 130-5 0.01 torr | 85.67 85.66 | 8.32 8.28 |
| 2 | | 133-7 0.01 torr | 85.66 85.70 | 9.15 9.20 |
| 3 | | 138-42 0.01 torr | 85.66 85.70 | 9.38 9.20 |
| 4 | | oil | 85.67 85.01 | 8.32 8.28 |
| 5 | | oil | 81.44 81.30 | 8.70 8.80 |
| No. | Compound | M.p. °C. | [calculated/found] % C | H | S |
|---|---|---|---|---|---|
| 6 | | oil | 77.74 77.60 | 7.46 7.4 | 7.41 7.5 |
| 7 | 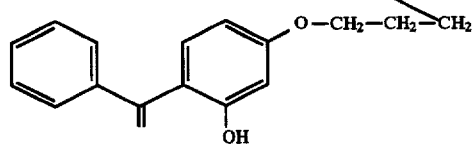 | 130-5 | 80.60 80.40 | 6.37 6.5 | |

TABLE 1-continued

| 8 | CH₃—CO—O, H₁₇C₈—O substituted benzylidene structure | oil | 78.65 8.25 |
|---|---|---|---|
|   |   |   | 78.36 8.27 |

EXAMPLE 10

Stabilisation of elastomers: Brabender test

A styrene/butadiene/styrene (SBS) elastomer (®Finaprene 416) is combined with 0.25% of the additive in question and aged in a Brabender plastograph. For that purpose, the mixtures are kneaded in a Brabender plastograph at 200° C. and 60 rpm. During that time, the kneading resistance is continuously registered as a turning moment. In the course of the kneading time, after initially being constant the turning moment suddenly increases as a result of the cross-linking of the polymer. The effectiveness of the stabilisers is manifested in a lengthening of the constant period. The values obtained can be found in Table 2.

TABLE 2

| Compound from Example | Time in min. until rise in turning moment |
|---|---|
| — | 6.1 |
| 4 | 12.2 |
| 1 | 10.3 |
| 2 | 11.1 |
| 5 | 12.2 |

EXAMPLE 11

Stabilisation of polypropylene with multiple extrusion.

1.3 kg of polypropylene powder (Profax 6501), which has been pre-stabilised with 0.025% Irganox® 1076 (3-[3,5-di-tert-butyl-4-hydroxyphenyl]propionic acid n-octadecyl ester), (with a melt index of 3.2 measured at 230° C. and with 2.16 kg) are mixed with 0.05% Irganox® 1010 (pentaerythritol-tetrakis[3-(3,5-di-tert-butyl-4-hydroxyphenyl)propionate), 0.05% calcium stearate, 0.03% DHT 4A® (Kyowa Chemical Industry Co. Ltd., [Mg$_{4.5}$Al$_2$(OH)$_{13}$CO$_3$.3.5 H$_2$O]) and 0.015% compound from Table 1. That mixture is extruded in an extruder having a cylinder diameter of 20 mm and a length of 400 mm at 100 revolutions per minute, the 3 heating zones being adjusted to the following temperatures: 260°, 270°, 280° C. For the purpose of cooling, the extrudate is drawn through a water bath and is then granulated. That granulate is repeatedly extruded. After three extrusions the melt index is measured (at 230° C. with 2.16 kg). A large increase in the melt index represents severe degradation of the chain, that is to say poor stabilisation. The results are compiled in Table 3.

TABLE 3

| Compound from Table 1 | Melt index after 3 extrusions |
|---|---|
| — | 17.1 |
| 1 | 7.4 |

TABLE 3-continued

| Compound from Table 1 | Melt index after 3 extrusions |
|---|---|
| 2 | 7.1 |
| 3 | 7.2 |
| 7 | 10.2 |
| 6 | 8.6 |

What is claimed is:

1. A composition comprising an organic material liable to thermal, oxidative and/or actinic degradation and at least one compound of formula (I)

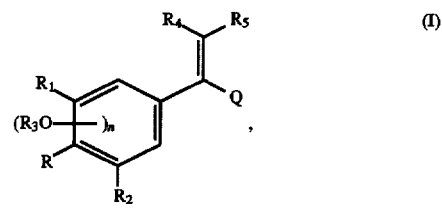

wherein
Q is a radical

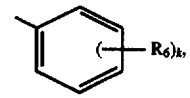

wherein
n is 1 or 2 and k is 0, 1 or 2,
or Q together with R$_5$ forms a group

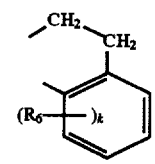

and n is 1,

R is hydrogen, has the same possible meanings as R$_3$O or, when R$_3$ is hydrogen and n is 1, together with R$_1$ or with R$_2$ forms a group

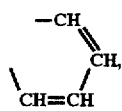

R$_1$ is hydrogen, C$_1$–C$_{18}$alkyl or C$_5$–C$_{12}$cycloalkyl,
R$_3$ is hydrogen, C$_1$–C$_{18}$alkyl or C$_5$–C$_{12}$cycloalkyl,
R$_4$ and R$_5$ are each independently of the other hydrogen, C$_1$–C$_{12}$alkyl or C$_5$–C$_{12}$cycloalkyl, $R_6$ is $-NO_2$, $-C\equiv N$, $-COOR_{13}$, $-S-R_{14}$, $-SOR_{14}$, $-SO_2-R_{14}$, $-NR_7R_{7a}$, Cl, Br, F, $-OR_{15}$ or $-COR_{16}$, or two radicals $R_6$ together form a fused-on benzo ring, $R_7$ and $R_{7a}$ are each independently of the other hydrogen or $C_1-C_{12}$alkyl, $R_{13}$ is hydrogen or $C_1-C_{18}$alkyl, $R_{14}$ is $C_1-C_8$alkyl or phenyl, $R_{15}$ is hydrogen, $C_1-C_{18}$alkyl, or $C_5-C_{12}$cycloalkyl, and $R_{16}$ is $C_1-C_{18}$alkyl, or $C_5-C_6$cycloalkyl.

2. A composition according to claim 1, wherein $R_1$ is hydrogen, $C_1-C_{12}$alkyl or cyclohexyl, $R_2$ is hydrogen, $C_1-C_8$alkyl or cyclohexyl, $R_3$ is hydrogen or $C_1-C_8$alkyl, $R_4$ and $R_5$ are each independently of the other hydrogen or $C_1-C_8$alkyl, $R_6$ is $-NO_2$, $-C\equiv N$, $-COOR_{13}$, $-CO-R_{16}$, $-SO-R_{14}$, $-SO_2-R_{14}$ or flourine, $R_{13}$ is $C_1-C_{12}$alkyl, and $R_{14}$ is $C_4-C_8$alkyl or phenyl.

3. A composition according to claim 1, wherein a radical $R_3O$ is in the ortho-position to the alkenyl group.

4. A composition according to claim 1, wherein at least one of the groups $R_3O$ is hydroxy.

5. A composition according to claim 1, wherein n is 1 and $R_3O$ is OH and is in the ortho-position to the alkenyl group.

6. A composition according to claim 1, wherein

R has the same possible meanings as $R_3O$ or is hydrogen, $R_1$ is hydrogen or $C_1-C_{12}$alkyl, $R_2$ is hydrogen or $C_1-C_8$alkyl, $R_3$ is hydrogen or $C_1-C_{18}$alkyl $R_4$ is hydrogen, $R_5$ is hydrogen, ethyl or methyl, and $R_6$ is $NO_2$, S-phenyl or $SO_2$-phenyl.

7. A composition according to claim 6, wherein R is hydrogen, $R_1$ is hydrogen or $C_1-C_{12}$alkyl, $R_2$ is hydrogen or $C_1-C_8$alkyl, $R_4$ and $R_5$ are hydrogen, n is 1, $R_3$ is hydrogen and the group $-OR_3$ is in the ortho-position to the alkenyl group.

8. A composition according to claim 1, comprising at least one compound of the formula

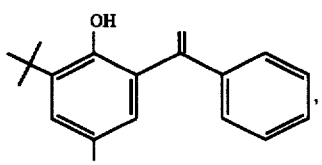,

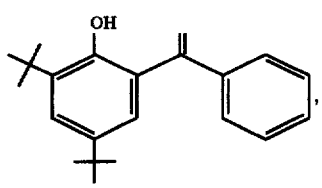,

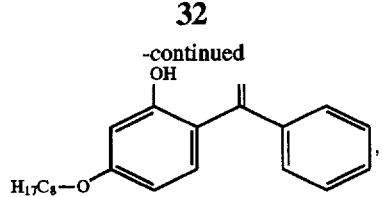,

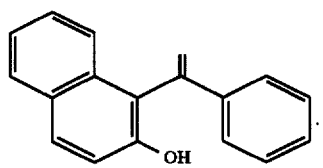.

9. A composition according to claim 1, wherein the organic material is a lubricant, a metal-working fluid, a hydraulic fluid, or a natural, (semi-)synthetic or synthetic polymer.

10. A composition according to claim 9, wherein the organic material is a lubricant.

11. A composition according to claim 9, wherein the organic material is a thermoplastic plastic or an elastomer.

12. A composition according to claim 11, wherein the organic material is a polyolefin.

13. A composition according to claim 1, which additionally comprises further stablisers selected from the group consisting of anti-oxidants, light-stabilising agents and processing or heat stabilisers.

14. A method of stabilising organic material, which comprises adding a compound of formula I according to claim 1 to the organic, or applying it thereto, as stabiliser.

15. A method according to claim 14 wherein the organic material is selected from the group consisting of lubricants, metal-working fluids, hydraulic fluids and synthetic, natural or semi-synthetic polymers.

16. A compound of formula I defined in claim 1, with the exclusion of the individual compounds of formula Ib

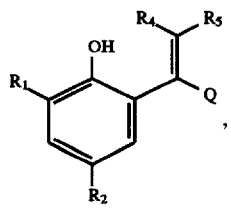 (Ib)

wherein $R_1$ is tert-butyl, $R_2$ is methyl, $R_4$, $R_5$ are each hydrogen and Q is phenyl, or $R_1$ is tert-butyl, $R_2$, $R_4$, $R_5$ are each hydrogen and Q is phenyl, or $R_2$ is methyl, $R_1$, $R_4$, $R_5$ are each hydrogen and Q is phenyl, or $R_1$ is tert-butyl, $R_2$ is tert-butyl, $R_4$, $R_5$ are each methyl and Q is phenyl, or $R_1$ is methyl, $R_2$, $R_4$, $R_5$ are each hydrogen and Q is phenyl, or $R_1$ is hydrogen, $R_2$ is tert-butyl, $R_4$, $R_5$ are each hydrogen and Q is phenyl.

17. A compound of formula I defined in claim 1, with the proviso that $R_1$ and $R_2$ are not alkyl when R and $R_3$ are hydrogen, n is the number one and $R_3O$ is in the ortho-position to the alkenyl group.

* * * * *